United States Patent [19]

Knees

[11] Patent Number: 5,107,096

[45] Date of Patent: Apr. 21, 1992

[54] COOKING UTENSIL

[75] Inventor: Hans Knees, Queanbeyan, Australia

[73] Assignee: Knees Industries Pty Ltd., Canberra, Australia

[21] Appl. No.: 582,666

[22] Filed: Sep. 13, 1990

[30] Foreign Application Priority Data

Sep. 20, 1989 [AU] Australia .............................. PJ6462

[51] Int. Cl.⁵ .................... F27D 11/00; A47J 37/04
[52] U.S. Cl. .................................. 219/436; 219/433; 219/438; 99/410; 99/421 R
[58] Field of Search ............... 219/433, 434, 436, 438, 219/521, 389; 99/422, 425, 416, 417, 410, 348, 421 R; 432/34

[56] References Cited

U.S. PATENT DOCUMENTS

| 3,439,603 | 4/1969 | Reames | 99/425 |
| 3,551,644 | 12/1970 | Sano | 219/433 |
| 3,829,655 | 8/1974 | Thibault | 219/521 |
| 4,173,925 | 11/1979 | Leon | 219/389 |
| 4,301,717 | 11/1981 | Knees | 99/348 |

Primary Examiner—Bruce A. Reynolds
Assistant Examiner—Tuan Vinh To
Attorney, Agent, or Firm—Dvorak and Traub

[57] ABSTRACT

The invention concerns a utensil for cooking food. There is a container provided with an opening for insertion and removal of the foodstuffs to be cooked. The container is mounted on a stand and may be used at an angle of about 90 degrees or about 45 degrees. A speed control to permit stirring of the ingredients is provided. Any suitable heating source may be used.

6 Claims, 4 Drawing Sheets

COOKING UTENSIL

FIELD OF THE INVENTION

This invention deals with the art of food preparation for human consumption, i.e. cooking. Cooking is the art and science of preparing foods for the table, usually by heating them until they are changed in one or more of the following—flavour, tenderness, appearance and chemical composition. Thus cooking develops flavour and makes many foods more attractive in appearance. It also makes some foods easier to digest. Because the effect of food is so important to health; cooking has developed into a science and a large number of cooking utensils has been developed, each having claimed specific advantages, covering everything from more rapid cooking and flavour enhancement to all-day simmering and vitamin retention.

DESCRIPTION OF THE PRIOR ART

Whether an electric fry-pan or a gas heated aluminium saucepan is used, problems generally arise in that foods tend to stick to the cooking utensil and eventually burn, which, apart from resulting in the ruining of the food, can also at worst destroy the cooking utensil, or at best make it difficult to clean even with proprietary products comprising steel wool, powdered abrasives, or modern detergents. In any case cooking goods of the "liquid" (e.g. stews or custards) or "discrete" types (e.g Chinese foods such as fried rice or braised vegetable/-meat dishes) requires an even, controllable temperature.

To this end recipes for this type of cooking often specify continual stirring during the higher temperature phase of the operation—in fact, Chinese cuisine (Cantonese style) is basically defined as stir-fry cooking done at a high temperature. Clearly the stirring is essential to avoid sticking and burning.

Similarly, in the art of sweets and confectionery cooking, high temperatures are required, as is very frequent stirring. On the other hand, dishes such as stews and casseroles are left to cook for hours at a low temperature and require little or no stirring. If these latter dishes could be cooked at a higher temperature, cooking time could be reduced but constant stirring to avoid burning and impairment of flavour would be required.

Having regard to the problems referred to above, there is clearly a need for a type of cooking utensil which can operate at relatively high temperatures without causing burning of the ingredients. An attempt has been made to supply this need by providing fry-pans and saucepans with TEFLON (Registered Trade Mark) coatings. (TEFLON is a fully fluorinated copolymer of hexafluoropropylene and tetrafluoroethylene.)

These coatings certainly prevent the food from sticking to the bottom or walls of the utensils, but they still involve two major disadvantages. Firstly, the food can still burn, and secondly continued usage of the utensils at high temperatures destroys the coatings. A third disadvantage is that the coatings are adversely affected if touched with metallic objects such as metal spoons.

U.S. Pat. No. 4,173,925 to Joseph L Leon describes a heated, variable tilt, rotating container or pot for making possible automatic, continuous mixing or tumbling, with or without simultaneous heating, of a plurality of foods or substances. The device consists of an outer non-rotating shell pivoting on a fixed base. Inside the shell is a pot rotated by a motor attached to the bottom of the shell. A cover is secured over the pot to prevent the contents from spilling out. The shell and its pot are tiltable as a unit to any angular position from vertical to horizontal. Compartments, dividers, ridges, projections or other shapes are inside the rotating pot or on the pot wall and/or bottom, to separate, move, mix and tumble the contents when the tilt angle of the pot is other than at the vertical position. The shell contains a suitable heating system for raising the temperature of the pot. The device is provided with an automatic temperature control, motor speed control and automatic time cycle and function indicators.

This device is however, somewhat different in construction from that contemplated herein as a comparison will show. For example, whereas the Leon device uses a plurality of runner wheels (27) to support the cooking vessel for rotation near its collar, the cooking device of the present invention is free-standing being supported only at its base on the means which rotates it.

In a previous patent (see e.g. U.S. Pat. No. 4,301,717), this object was broadly achieved by providing a container for ingredients to be cooked, an opening in said container for entering and removing said ingredients, said container being mounted on a stand so as to be rotatable about a normally upright axis, the mounting arrangement being such that the container can be tilted whereby said axis adopts an inclined attitude, means to retain said container in a position corresponding to a selected attitude of said axis, and means to rotate said container about said axis at a speed such that stirring but not centrifuging of ingredients contained therein will take place.

The present invention represents an improvement over the device of the aforesaid patent as will appeaar hereinafter.

SUMMARY OF THE INVENTION

It is therefore a principal object of this invention to provide a cooking utensil which can be used at high or low temperatures without burning the food or causing sticking and which therefore overcomes the problems and disadvantages hitherto experienced, and as discussed in the foregoing paragraphs.

In one aspect this invention provides a cooking utensil comprising a container for ingredients to be cooked, said container including a base, side walls, and an open top for entering and removing said ingredients; a vessel having a base and side walls enclosing the base and side walls of said container, said vessel including heating apparatus for said container; a shaft attached to the base of the container and protruding downwardly therefrom through said vessel, said container freely supported and rotatable within said vessel by means of said shaft, a bearing mounted in the base of said vessel for rotatably holding said shaft, said bearing supporting an electric motor connectable to rotate said shaft and thereby said container, characterised in that said vessel is held within a shroud like cover having a base support and an elevated support on the side thereof whereby the utensil as a whole can be held on a surface with the container axis upright at about 85 degrees to 95 degrees to the horizontal by the base support, or in an inclined position about 45 degrees to 55 degrees to the horizontal by said base support and said elevated support acting in concert.

In another aspect this invention provides a cooking utensil comprising a container for ingredients to be cooked, said container including a base, side walls, and an open top for entering and removing said ingredients; a vessel having a base and side walls enclosing the base and side walls of said container, said vessel including heating apparatus for said container; a shaft attached to the base of the container and protruding downwardly therefrom through said vessel, said container freely supported and rotatable within said vessel by means of said shaft, a bearing mounted in the base of said vessel for rotatably holding said shaft, said bearing supporting an electric motor connectable to rotate said shaft and thereby said container, characterised in that said vessel is held within a shroud like cover having a base support and an elevated support on the side thereof whereby the utensil as a whole can be held on a surface with the container axis upright by the base support, or in an inclined position by said base support and said elevated support acting in concert, and said vessel being double walled with an insulating air cavity or insulation material in the space between the walls.

DETAILED DESCRIPTION

Figure 1:
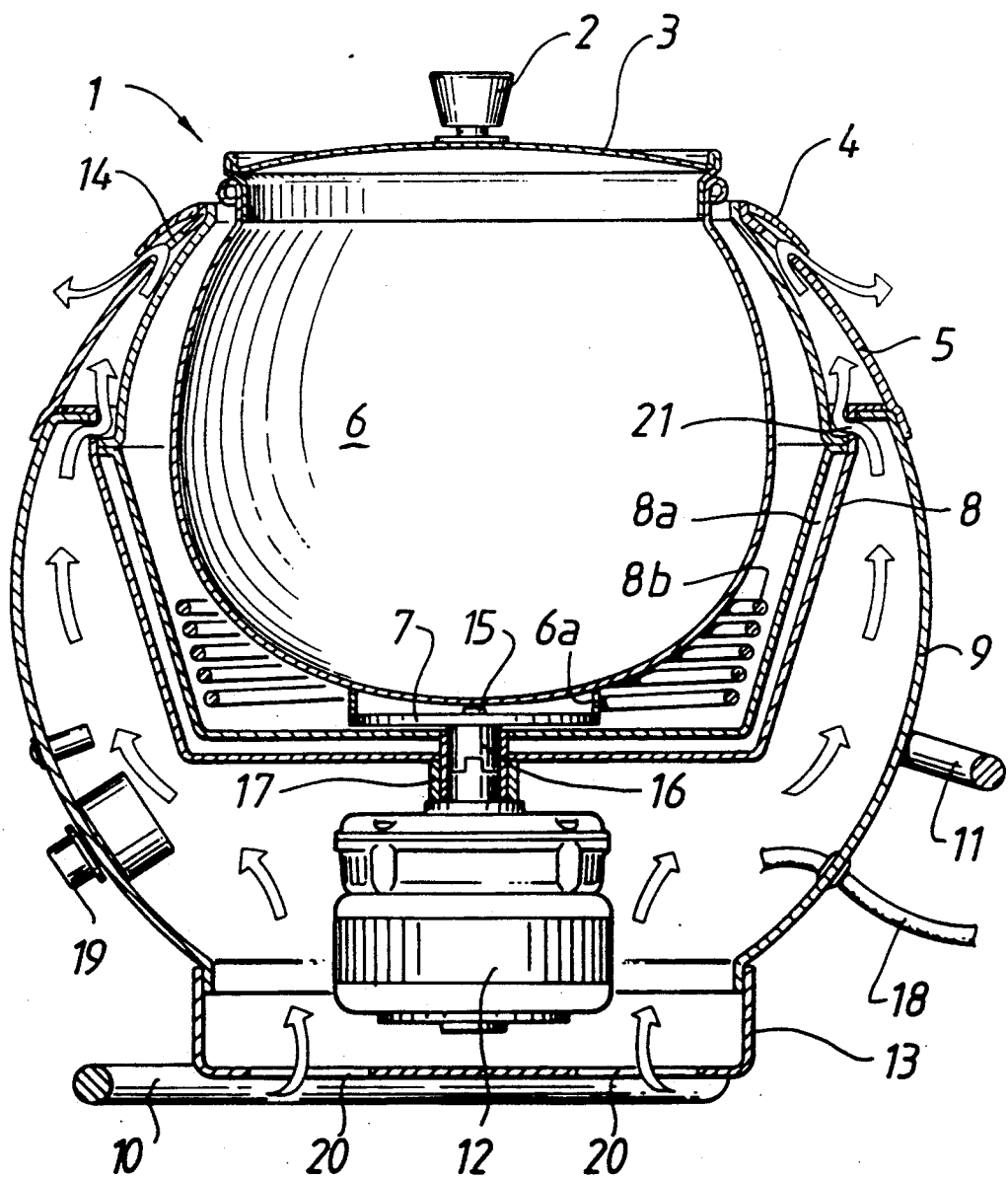
FIG. 1 is a cross-section view of a preferred embodiment of the cooking device shown in vertical cross-section.
Figure 2:
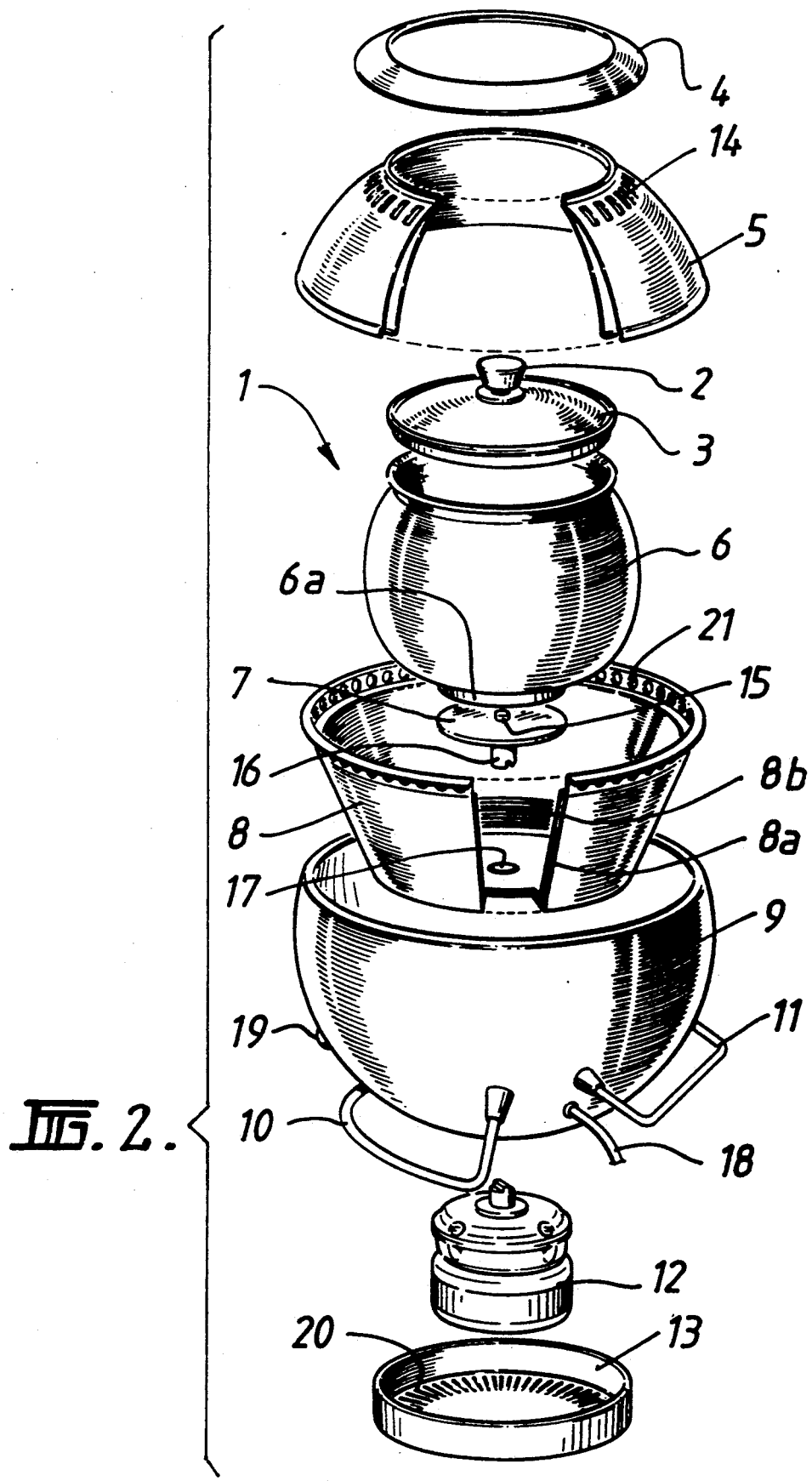
FIG. 2 is an exploded view of the embodiment of the invention shown in FIG. 1.
Figure 3:
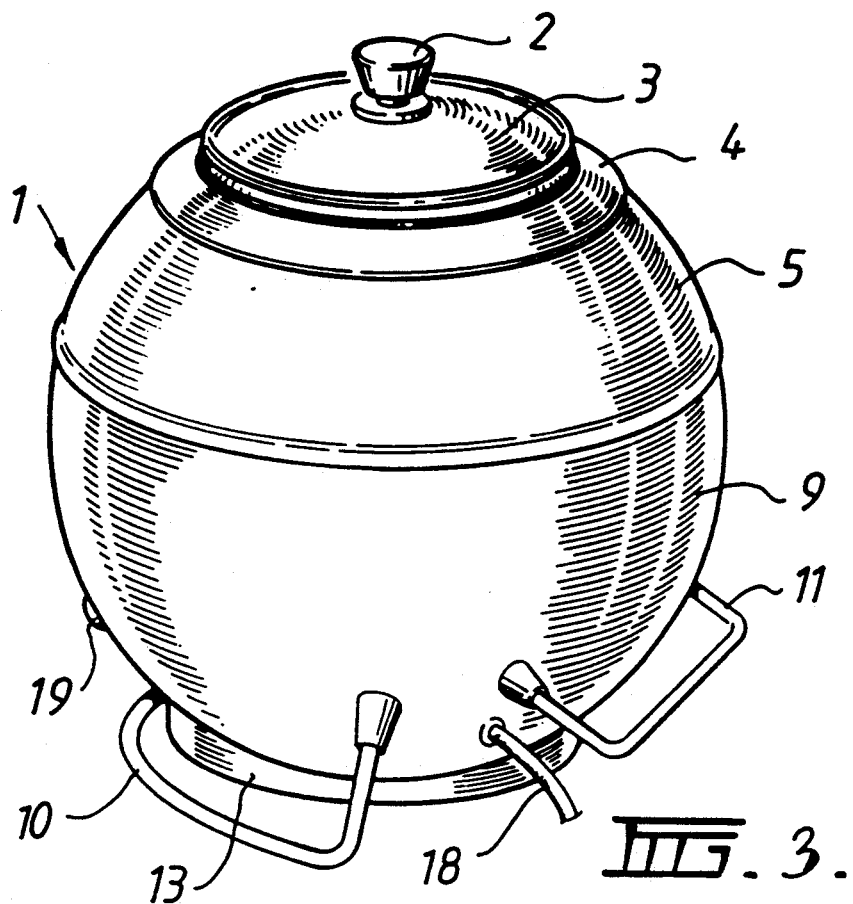
FIG. 3 shows the cooking device of the invention in an upright position.

In FIG. 1 is shown a cooking utensil 1 having a lid 3 with handle or knob 2. There is a cooking bowl 6 having a base 6a mounted on drive plate 7. An electrically heated insulated container 8 surrounds the bowl 6 as shown. Insulation is by means of air chamber 8a; and 8b represents the electrical heating elements. Overall, the bowl 6 and vessel 8 are enclosed (as shown) by container 9 having shroud 5 at the top thereof. Shroud 4 acts as a heat deflector. The unit is mounted on stand 10 and there is a support 11 (see FIGS. 2 to 5 for better views thereof). Referring to all drawings, the unit has a base 13 and there is a motor/gearbox 12 for rotating vessel 6 through drive shaft 16. As illustrated there is a "dog clutch" arrangement in the shaft 16. The shaft 16 rotates in bush 17. A boss 15 heads the shaft 16 for locating drive plate 7 thereon. An electric power cord 18 supplies current to the motor and heating elements 8b, via control (for heating) 19. Slots 20 provide for air inlet. Air flow is as shown by the arrows in FIG. 1, through slots 21 and exit (outlet) slots 14.

Figure 4:
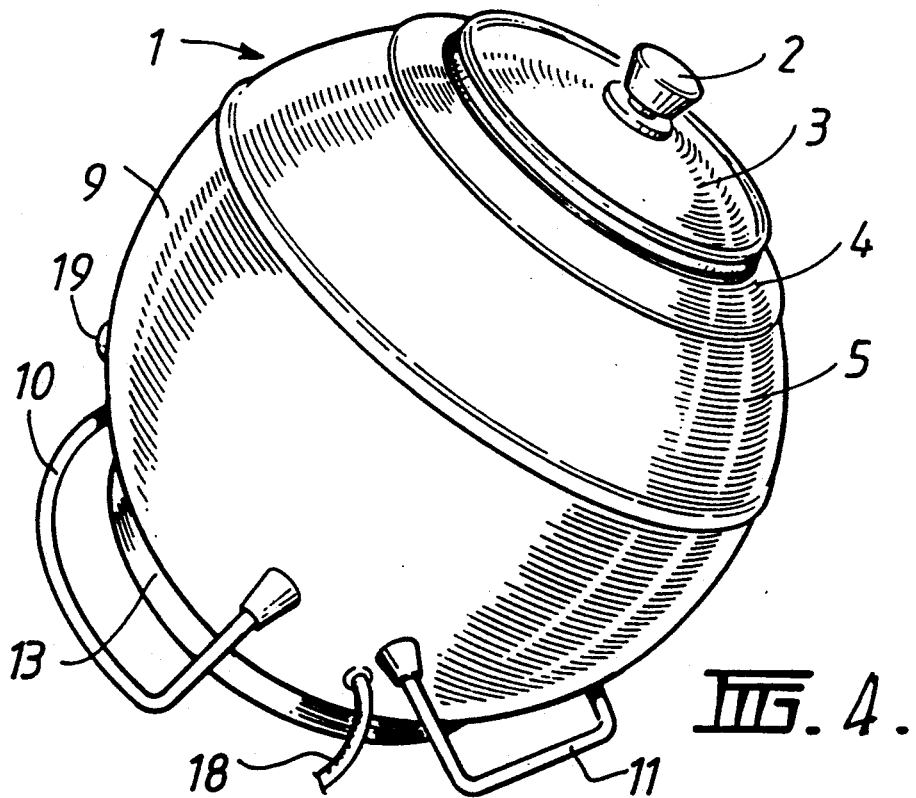
FIG. 4 shows the cooking device of the invention inclined at an angle of about 45 degrees.
Figure 5:
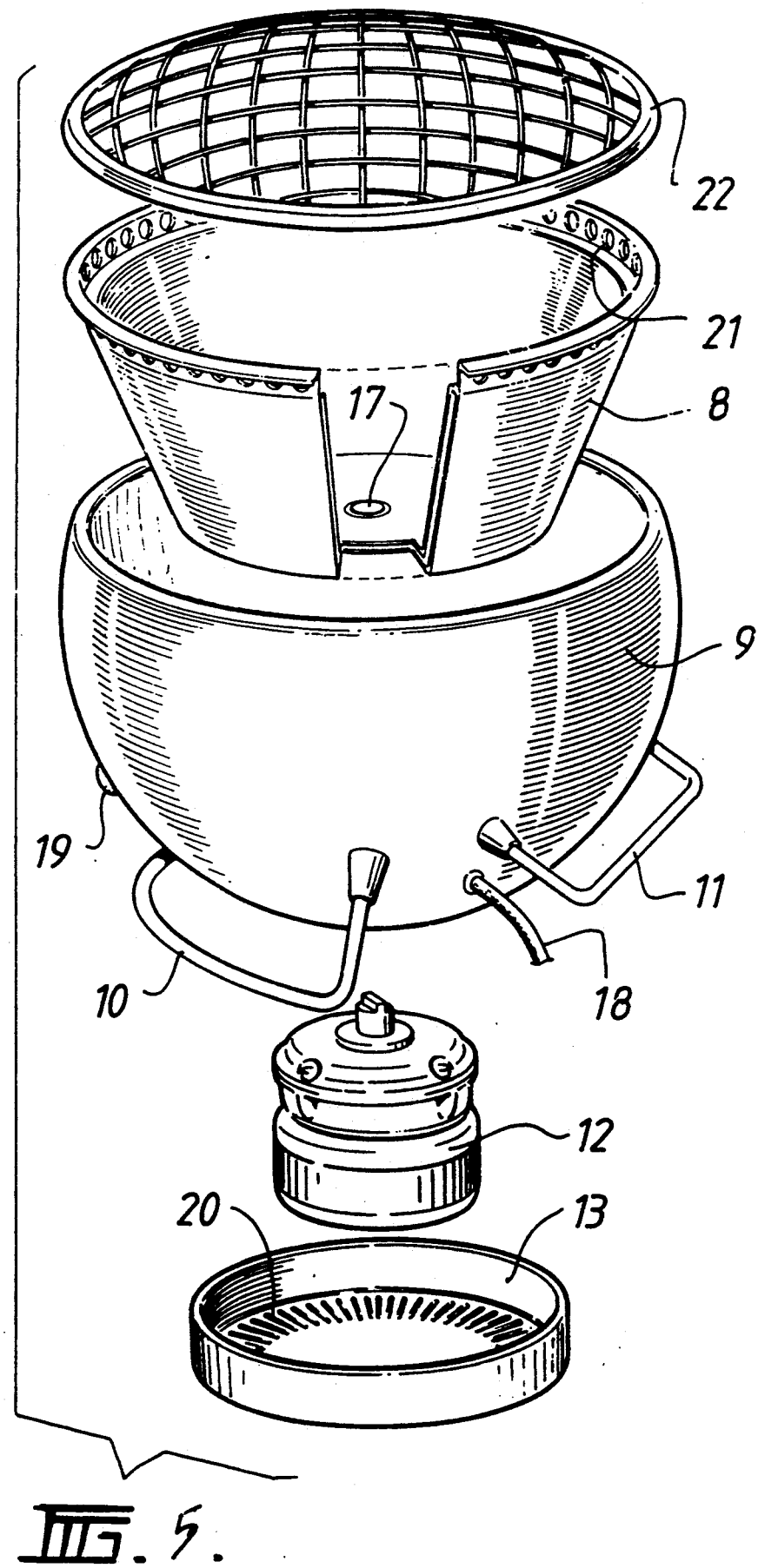
FIG. 5 is an exploded view of another aspect of the invention showing a heating device.

The unit 1 can be tilted to a 45-55 degree angle (see FIG. 4). The cooking utensil 1 does not require a continuously variable tilting device as described in U.S. Pat. No. 4,301,717, as it has been found that the preferred inclinations of the vessel are an upright position (about 85-90 degrees) and an inclined position (about 45-55 degrees). The angles refer to the inclination of the axis of rotation of container 6 to the horizontal. The speed of the motor can be varied by means of a speed controller (not shown) if desired, for cooking contents of different "viscosity".

Preferably, the utensil is of a generally spheroidal shape. Also, whilst the embodiment has been exemplified by reference to electrical heating, the elements 8b could in fact be steam tubes, or gas lines for natural gas or the like. In exemplary tests of the actual performance of the invention various foods were cooked using an aluminium cooking bowl and electrical heating means.

EXAMPLE 1

A vegetable soup comprising carrots, potatoes, onions, turnips, celery, with a small amount of water was placed in the pot and rotated at ten revolutions per minute. At the expiry of ten minutes, the resulting soup was served to a panel of five and judged to be properly cooked, palatable, and to have retained the natural flavours.

Using a higher rate of revolutions viz. eighteen revolutions per minute, the test was repeated and at the end of six minutes, a soup of similar standard was obtained.

By comparison preparing a vegetable soup with the same ingredients by conventional methods in a saucepan over an electric stove required some twenty to thirty minutes of cooking with spasmodic stirring to achieve a fully cooked result. By general consensus of the panel, the flavour and palatability of the conventional soup was inferior to the soup prepared by the device of the invention.

EXAMPLE 2

Like experiments were carried out by cooking chicken pieces in a small quantity of water and cooking oil. A properly cooked dish was available after only seven minutes at a speed of twenty-five revolutions per minute and ten minutes at a speed of fifteen revolutions per minute.

In a like manner an excellent beef stew was prepared from diced beef pieces in less than eight minutes.

Having regard to the above examples and to the preparation of other meals it is apparent that the device of this invention has advantages including:

1. The device cooks more efficiently and faster than cooking utensils in current use.

2. The device can be used to mix foods before as well as during cooking.

3. A wide variety of foods from stir-fried Chinese cooking to English style custards can be cooked without any sticking to the container, or any burning.

4. There is less danger of accidents during cooking from confined steam, or hot fat splashing.

5. When cooking is finished there is no need to scrape the container or to remove it for cleaning—the food is simply tipped out and the container can be readily cleaned in situ.

6. If the device is of the electric type, it can be made completely automatically operated on pre-set controls, i.e. temperature, time of heating at various temperatures, speed and amount of rotation can all be pre-set.

Any suitable materials may be used in the device of the invention and e.g. the cooking bowl may be stainless steel, ceramic or aluminium.

It is emphasised that this invention is to be given a wide connotation and is not to be restricted to the embodiments specifically described.

I claim:

1. A cooking utensil comprising:
    an ingredient container for containing ingredients to be cooked, said ingredient container having a base, side walls, and a closeable opening for the receiving and removal of said ingredients, a heating chamber substantially enclosing said ingredient container base and side walls, said heating chamber having a base, side walls and heating means arranged and constructed to heat said ingredient container and ingredients therein, and a bearing supported by said base and rotatably supporting said ingredient container, a housing substantially enclosing said heating chamber, said housing having a support base and side walls, a motor disposed within said housing, said motor arranged and constructed to rotate said ingredient container, and a support stand extending outwardly from said housing, said support stand having a plurality of support surfaces arranged and constructed to engage a planar surface on which said cooking utensil is positioned, whereby said cooking utensil is supportable in stable equilibrium in a plurality of inclined positions.

2. A cooking utensil according to claim 1, wherein said support stand comprises a curvilinear element arranged and constructed to engage said planar surface to support said cooking utensil in stable equilibrium in a substantially vertical position, and a rectilinear element arranged and constructed to engage said cooking utensil in stable equilibrium at an inclination on the order of 45° to 50° from horizontal.

3. A cooking utensil according to claim 2, further comprising a cover having a lower portion and an upper portion, said lower portion abutting an upper portion of said housing side walls and said heating chamber side walls, said upper portion abutting said cooking utensil opening.

4. A cooking utensil according to claim 3, wherein said housing and said cover include vents, whereby convection cooling of said motor and an outer surface of said heating chamber is effected by upwards passage of air between said housing and said heating chamber into said lower portion of said cover and out from said upper portion of said cover.

5. A cooking utensil according to claim 4, wherein said heating chamber is double walled and comprises an insulation means in a space between said double walls.

6. A cooking utensil comprising:

an ingredient container for containing ingredients to be cooked, a heating chamber substantially enclosing said ingredient container, said chamber having heating means arranged and constructed to heat said ingredient container and ingredients therein, a housing substantially enclosing said heating chamber, a motor disposed within said housing, said motor arranged and constructed to rotate said ingredient container, and a support stand extending outwardly from said housing, said support stand having a plurality of support surfaces arranged and constructed to engage a planar surface on which said cooking utensil is positioned, whereby said cooking utensil is supportable in stable equilibrium in a plurality of inclined positions.

* * * * *